March 17, 1925.

H. A. JONES

MECHANICAL INSTRUMENT PLAYER

Filed March 3, 1922   5 Sheets-Sheet 1

1,530,123

Inventor
Henry A. Jones

By
Attilla Buck
Attorney

March 17, 1925.
H. A. JONES
MECHANICAL INSTRUMENT PLAYER
Filed March 3, 1922   5 Sheets-Sheet 2
1,530,123
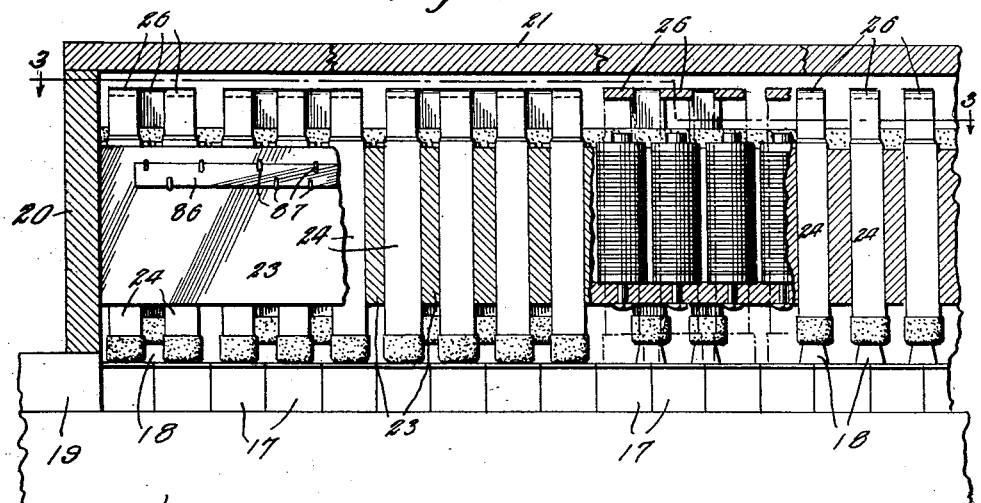
Fig. 2.
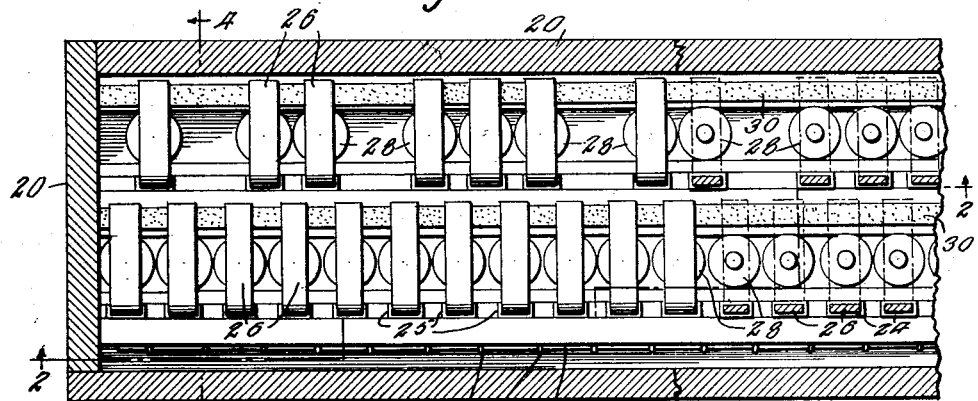
Fig. 3.
Fig. 4.
Inventor
Henry A. Jones
By
Attorney March 17, 1925.

H. A. JONES

MECHANICAL INSTRUMENT PLAYER

Filed March 3, 1922

Inventor
Henry A. Jones
By
Attorney

March 17, 1925.

H. A. JONES

MECHANICAL INSTRUMENT PLAYER

Filed March 3, 1922  5 Sheets-Sheet 4

Inventor
Henry A. Jones

By   Attorney

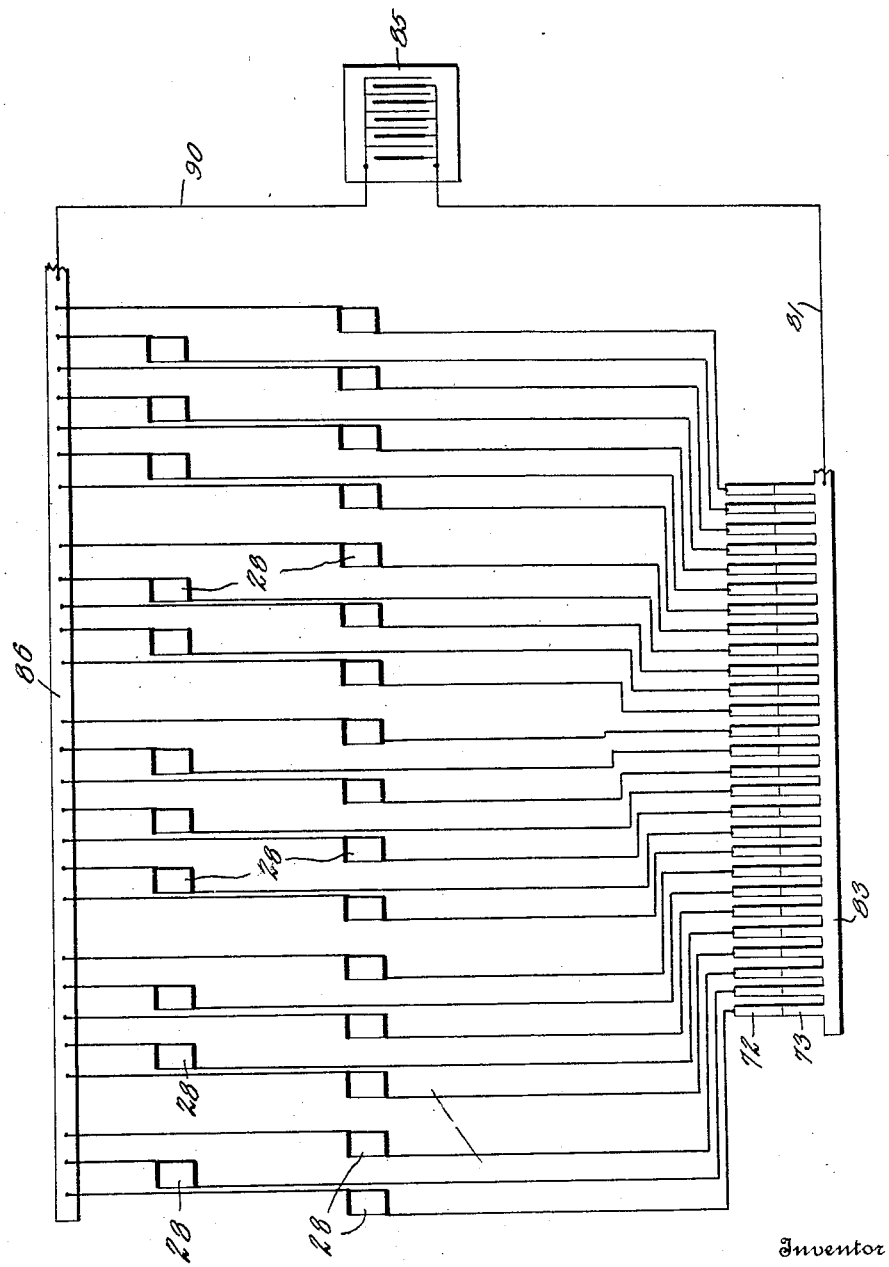

Patented Mar. 17, 1925.

1,530,123

UNITED STATES PATENT OFFICE.

HENRY A. JONES, OF LILBOURN, MISSOURI.

MECHANICAL INSTRUMENT PLAYER.

Application filed March 3, 1922. Serial No. 540,743.

*To all whom it may concern:*

Be it known that I, HENRY A. JONES, a citizen of the United States, residing at Lilbourn, in the county of New Madrid and State of Missouri, have invented certain new and useful Improvements in a Mechanical Instrument Player, of which the following is a specification.

This invention relates to mechanical instrument players, being adaptable particularly to pianos, organs and other similar key operated musical instruments.

A primary object of the invention is to provide an instrument player which is readily adaptable to, for instance, a piano, which may be readily applied to or removed from the piano, and which does not require any change or modification in the construction or operation of the musical instrument.

A further object of the invention is to provide an instrument player of such character as to be readily applicable to the instrument without marring or disfiguring the same, and without presenting an unsightly appearance.

A still further object of the invention is to provide an instrument player of the character stated which is of comparatively small size and light weight, and will thus enable the same to be readily handled and applied to or removed from the instrument, and which is so constructed as to obviate the possibility of the playing device being improperly applied to the musical instrument.

A still further object of the invention is to provide an instrument player of such construction as to enable the instrument to be operated or controlled at a distance therefrom.

A still further object resides in the provision of a mechanical key operating instrument player of that character wherein a traveling web or roll is utilized for controlling electric circuits in operating the several keys of the instrument, and wherein a mechanism of an improved and simplified nature is employed for making and breaking the electrical connections.

A still further object resides in the specific construction and arrangement of the electrically controlled key operating plungers or fingers.

With these objects in view, together with others which will appear as the description proceeds, the invention consists in the novel construction, combination and arrangement of parts, or as will be described more fully hereinafter, illustrated in the drawings, and particularly pointed out in the claims.

In the drawings:

Fig. 2 is an enlarged fragmentary view taken through the instrument key depressing mechanism, Fig. 3 is a plan view, parts in section, of the device as shown in Fig. 2.

Fig. 4 is a transverse sectional view taken substantially upon line 4—4 of Fig. 3.

Fig. 13 is a diagrammatic view illustrating the wiring employed in carrying forth the invention.

Figure 1:
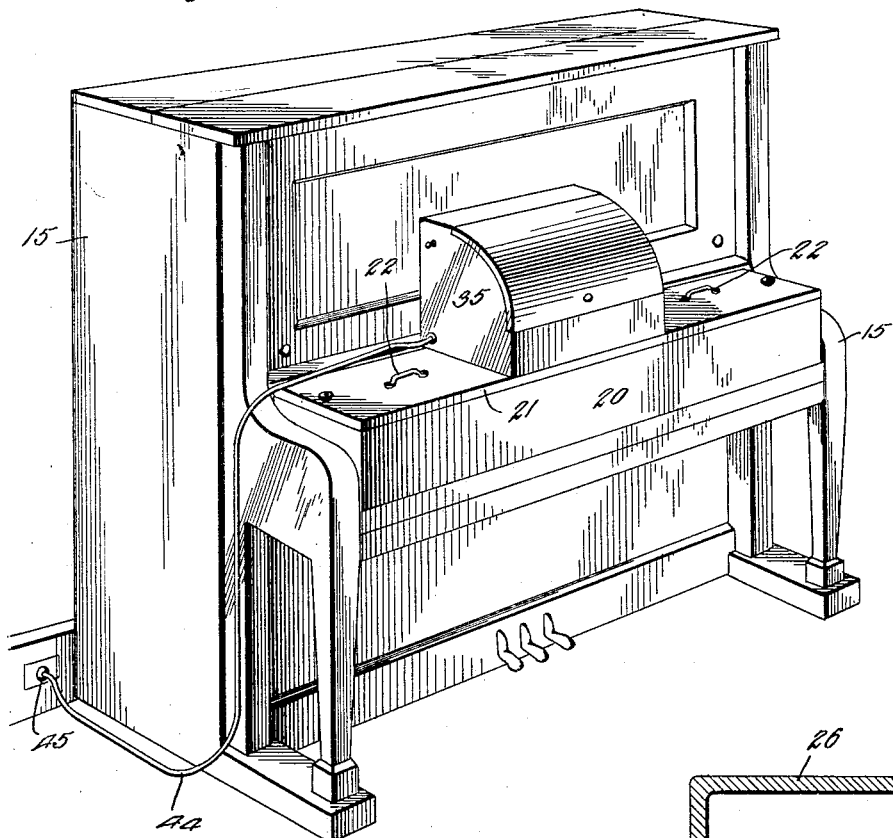
Fig. 1 is a perspective view of a conventional form of key operated musical instrument, such as a piano, and illustrated as applied thereto and player device constructed in accordance with the invention.

The present embodiment of the invention is illustrated as applied to a familiar type of piano, but it will be understood that the present illustration is for the purpose merely of disclosing the operation of the invention, and it is obvious that the invention may be carried out equally as well and used with equal efficiency with other types of key operated musical instruments, such, particularly, as wind or reed organs.

Referring now more particularly to the drawings, 15 indicates generally the body or case of a piano, the said case including a base board 16 underlying the white and black keys 17 and 18 respectively. This base board depends from the end pieces or blocks 19, as will be understood.

The mechanism employed for actuating the keys 17 and 18 is embodied in a case 20, the latter being constructed of wood or any other suitable material, and being of a length and breadth sufficient to enable the case to fit snugly over the key board of the piano. The case 20 may be provided with a removable top 21, the latter being fastened to the case in any approved manner, and being removable for the purpose of inspection or repair of the mechanism located within the case. This cover is equipped with handles or grips 22 to facilitate applying or removing the cover and enable the case to be readily moved from place to place.

Figure 5:
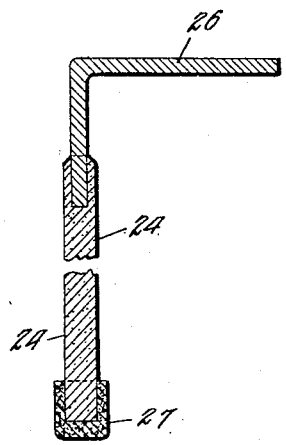
Fig. 5 is a detailed sectional view illustrating a preferred construction of one of the key operating plungers.

The case 20 is open at its lower end or bottom, and disposed longitudinally within the casing is a bar or bracket 23. This bracket supports a number of plungers 24, the said plungers sliding freely within apertures or recesses 25 within the said bracket. These plungers may be made of one piece, or they may be constructed as shown in Fig. 5 of the drawings, that is the major portion of the length of each plunger being formed in composition, with soft iron or other metallic fingers 26 offset from the upper ends of the plungers. The lower ends of these plungers rest upon the keys of the piano, and to obviate scratching or marring these keys feet of felt 27 are provided upon the lower ends of the plungers. The bracket 23 will contain a sufficient number of plungers to co-operate with the various keys of the instrument; a plunger being provided for each key.

Associated with each of the plungers 24 is a solenoid or electro-magnet 28. These magnets are suitably housed within the bracket 23, with their upper ends underlying the offset metallic fingers 26 of plungers 24, and adapted, when the magnets are energized, to attract the said fingers and cause the plungers 24 to move downwardly. In so doing, it is apparent that the key underlying the plunger will be caused to be depressed, whereupon the corresponding string of the instrument will be sounded. The plungers 24 slide sufficiently free within the bracket 23 as not to hinder movement of the keys 17—18 when the latter are returned to their normal or resting position by means of the spring mechanism (not shown) within the piano. This returning of the keys to normal position is only accomplished when the electro-magnets are deenergized, and returning of the keys to normal position simultaneously moves the plungers 24 to their upper or raised positions. To obviate knocking or pounding of the plungers in their downward movements, cushions 30 of felt or other material may be positioned within the case to arrest the movement of the electrically controlled members after the latter have moved downwardly sufficiently far to cause the musical note to be sounded.

The mechanism employed for energizing the proper magnets 28 at the proper times is housed within a body or cabinet indicated generally at 35. This cabinet may be of any preferred construction, size and shape, and is preferably sufficiently light to enable the same to be readily carried or moved from place to place. Within this cabinet there is arranged a drum 36, the latter positioned near the upper part of the cabinet, and the said drum being equipped with suitable means whereby one end of a music strip or web 37 may be attached. This strip is initially wound upon a reel 38 detachably mounted in the cabinet near the lower end thereof, and interposed between drum 36 and reel 38 is a tracker or idler roll 39 over which the web or strip passes from one reel to the other. To enable the music strip to properly pass from one reel to the other, the edges of the strip may be perforated as at 40 to receive teeth 41 at the ends of the tracker roll. This construction forms an adequate guide for the strip.

Figure 6:
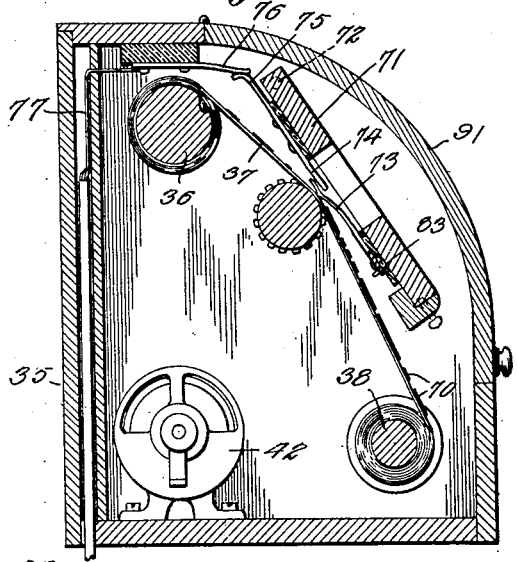
Fig. 6 is a transverse sectional view taken through one form of the roll containing cabinet.
Figure 8:
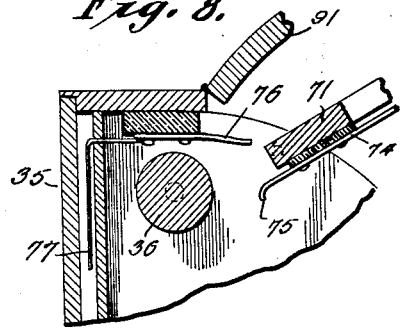
Fig. 8 is a fragmentary sectional view taken through the cabinet and illustrating the manner in which the contact carrying frame co-operates with the fixed contacts within the cabinet.
Figure 7:
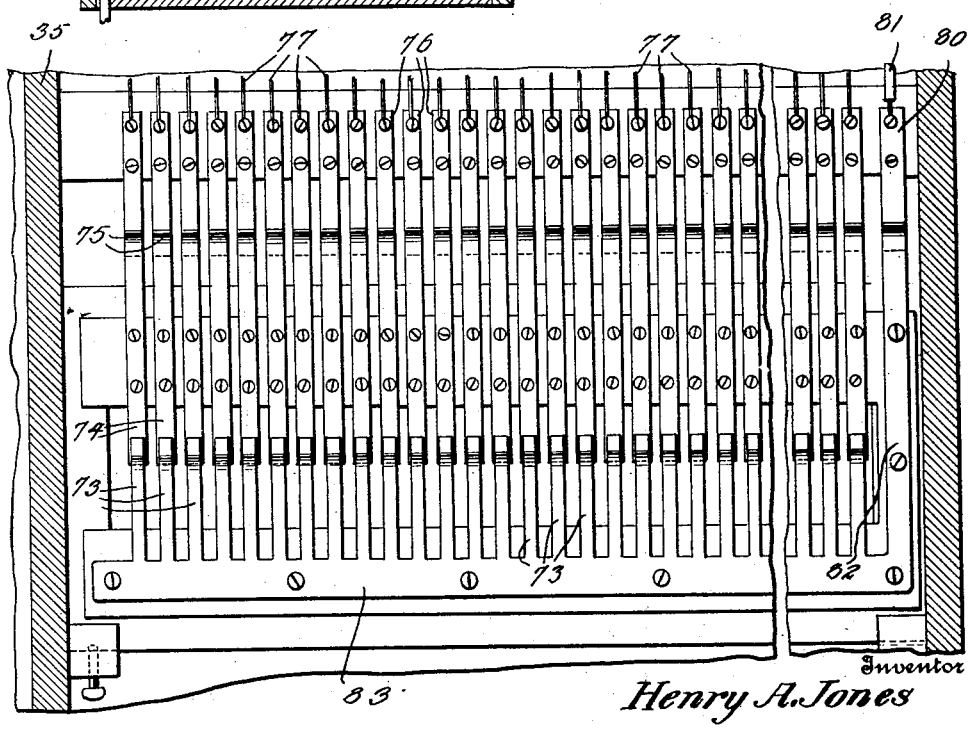
Fig. 7 is an enlarged plan view illustrating the contact mechanism contained within the roll cabinet.
Figure 9:
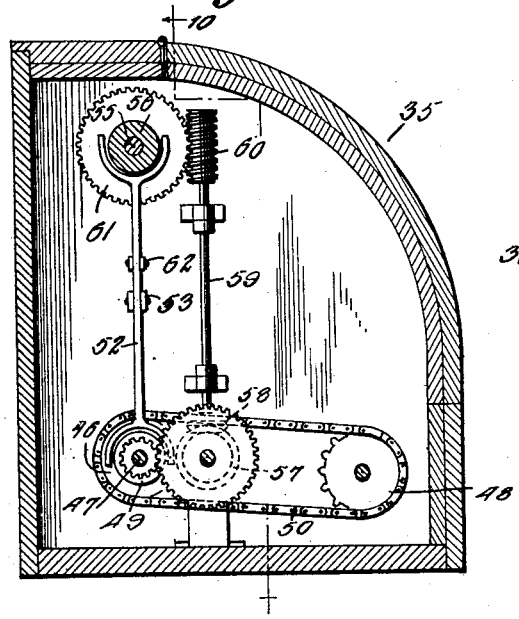
Fig. 9 is an elevation, parts in section, illustrating the power mechanism employed in the reeling and unreeling operations of the cabinet.
Figure 10:
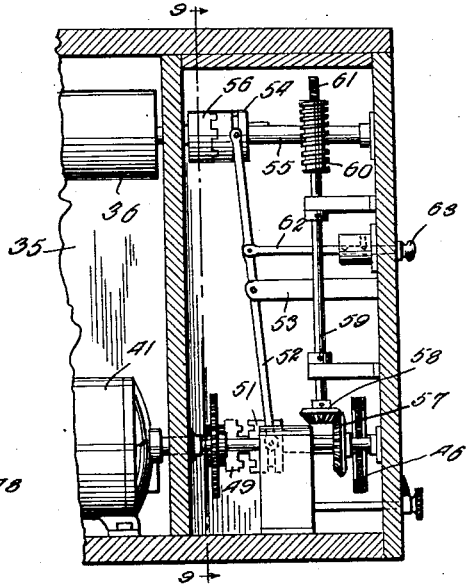
Fig. 10 is a sectional view taken substantially upon line 10—10 of Fig. 9.
Figure 11:
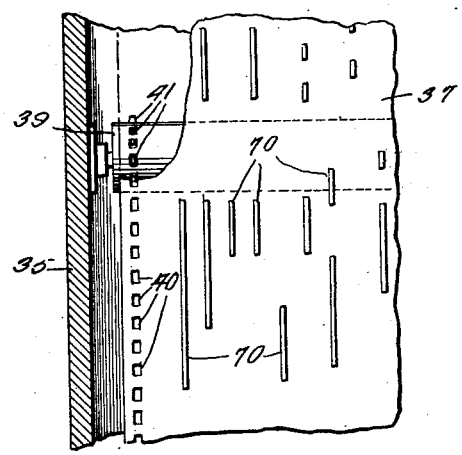
Fig. 11 is a fragmentary view showing the connection of the web or sheet with the tracker or idler roll.
Figure 12:
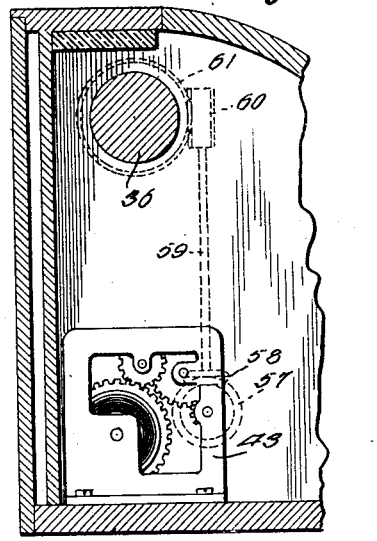
Fig. 12 is a fragmentary view of a modified form of player cabinet illustrated as arranged therein, a conventional type of spring motor for driving the reel mechanism.

Any suitable means may be employed for causing the strip to be wound upon either the drum or the roll. In Fig. 6 of the drawing there is shown a motor 42 of familiar type for this purpose, while in Fig. 12 a spring drum motor 43 is employed. Where an electric motor is used, lead 44 is necessary in order that the motor may be energized, and this lead may be equipped with a common type of plug 45 to be applied to the floor or base board socket of a house lighting circuit. In instances where a spring drum motor is used, it will be understood that a crank will be employed for tensioning the spring.

The motor or spring drum shaft of the power source is provided with a sprocket wheel 46, over which passes a chain 50 trained over a sprocket 48 for driving the reel 38. The motor or power shaft 47 is also provided with a clutch head 49, adapted to be engaged by a sliding clutch head 51 controlled by the lower end of an operating lever 52. This lever is pivoted intermediate its ends to an arm 53 or other support within the cabinet, and the upper end of this lever controls the movement of a clutch head 54 keyed or splined to shaft 55 axially alined with the drum 36. The shaft of drum 36 carries a fixed clutch head 56 adapted to be engaged by the head 54. The shaft 55 derives its movement from the motor or spring drum shaft 47; the said shaft having a bevelled gear 57 thereon in mesh with a similar gear 58 carried by the lower end of a vertically disposed shaft 59. The upper end of shaft 59 has a worm 60 that meshes with the teeth of worm gear 61 affixed to the shaft 55.

The movement of the clutch operating lever 52 is controlled by an operating stem 62, the latter extending through a suitable opening in the side of the cabinet and being equipped with a knob 63 by means of which the stem may be readily operated.

From this construction it is apparent that when the clutch head 54 is engaged with clutch member 56, a driving connection between the motor or spring drum shaft and the drum 36 will be established while the clutch head 51 will be disengaged from the member 49, thus severing the driving connection between the motor or spring drum shaft and reel 38. When it is desired to rewind the music web or strip, the rod 62 is withdrawn, disconnecting clutch heads 54—56 and coupling clutch 51 with clutch head 49. The operation of the spring or electric motor will then cause the reel 38 to be rotated so as to wind the web 37 thereon.

The web 37 is provided with a series of contact making members in the form of projections 70, arranged properly upon the outer face of the web and in such manner as to co-operate with the mechanism hereafter detailed in energizing at proper times the proper electro-magnets in the key operating mechanism. These projections may be formed of any suitable material, and need extend outwardly from the face of the sheet only a slight distance.

Arranged within the cabinet 35 and overlying the web 37 is a contact carrying frame 71. This frame is of a breadth equal to or slightly greater than the width of the web 37, and is hinged as at 72 near the upper part of the cabinet so as to be capable of swinging toward or away from the web 37. This frame is provided with a series of spaced contact members, the said members being arranged in pairs; those of the pairs being indicated at 72 and 73 respectively. The members 72 may be termed the fixed contact members, while 73 represents the movable contact members. The members 73 underlie the free ends of the fixed contact 72, and when the frame 71 is in its lowermost position the movable contact 73 rests lightly upon the outer surface of web 37 and directly over the tracker or idler roll 39. The contact making projections 70 carried by the web 37 extends outwardly from the surface of the web a distance sufficient to cause the movable contact 73 to engage the fixed contact 72 when such projections pass between the tracker roll and said movable contacts. It will be understood that the frame 71 will be provided with a number of pairs of contacts 72—73 corresponding with the number of keys upon the instrument to be played.

The contact members 72 are carried by and are electrically connected with a plate 74 secured to the frame 71; this plate has a rearwardly extending finger 75 for each of the fixed contacts 72. When the frame 71 is in operative or lowered position, the rear extremities of fingers 75 are in electrical contact with forwardly projecting contact members or fingers 76 arranged within the cabinet 35, and the fingers 76 each have a wire or lead 77 connected thereto and the said wires may be formed into a cable and extended to the several solenoids upon the player mechanism above described. When the frame 71 is raised, fingers 75 will move away from fingers 76 and the electrical connection between the said fingers is then broken.

The cabinet 35 at one side thereof has a fixed contact 80, to which one end of an electric conductor 81 is connected, and the frame 71 carries a contact member 82 adapted, when the frame is lowered, to engage the contact 80. The element 82 forms a part of a conductor plate 83 near the free end of frame 71, and this plate 83 is electrically connected with the several fingers 73, above described. The electric conductor 81 leads to one pole of a storage battery or other suitable source of electric energy indicated at 85.

The bracket 23 of the key board cabinet is provided at its outer end with a contact plate 86 extending throughout the length of the bracket, and each of the solenoids 28 carried by the bracket has one end thereof connected to plate 86 by a lead or conductor 87. The plate 86 is connected with battery 85 by means of a conductor 90. The opposite sides of electro-magnets 28 are connected by the wires 77 which lead from several contact fingers 76 of the player cabinet.

In operating the device the selected music web in roll form is applied to the cabinet 35 and the end thereof is passed over tracker 39 and is secured to drum 36. After the electrical connections have been made, as by applying plug 45 to the house connection and connecting conductors 81—90 with the source of electrical energy 85, and moving frame 71 downwardly so that the depressible fingers 73 rest lightly upon the web 37, the spring drum or electric motor is started. The clutches, of course, will be so set that power from the motor will wind drum 36 causing web 37 to be unwound from reel 38, passing over tracker 39 and wound upon drum 36. The tooth connection of the idler or tracker 39 with the web will assure proper and even feeding of the web. As the various projections arranged upon the web engage movable contact 73, the latter are caused to move inwardly into engagement with the fixed contacts 72. This operation causes a circuit to be closed through the said contacts and through the corresponding electro-magnet disposed above the cabinet key board. The magnet thus energized attracts finger 26 of plunger 24, whereupon the corresponding underlying key of the piano is depressed and the musical note is sounded. As soon as the projection on the web passes beyond the contact 73, the spring finger 73 will move away from and become disengaged from contact 72, whereupon the circuit is broken. When it is desired to produce sustained notes in the musical composition, the projections on web 37 will be lengthened, as will be understood. After the musical composition represented by the projections upon web 37 has been completed, the clutch mechanism is operated so as to rotate the reel 38 in such direction as to rewind the web and after this operation has been completed the music roll may be removed from the cabinet through the door 91.

It will be understood, of course, that immediately upon the contacts 72—73 being separated, the circuit through the corresponding magnet will be broken, and the plunger 24 will be released to the return action of the key 17—18 of the musical instrument, whereupon this particular part of the mechanism is reset for another operation.

Where a municipal electric system is available, the player mechanism as well as the reel controlling motor may be connected directly thereto, however, in rural districts, where such sources are not available, a familiar type of storage battery may be used for supplying the necessary electrical energy.

While the above is a description of the invention in its preferred form, it will be understood that the invention is not necessarily limited thereto, as changes or variations in the mechanical details may be liberally resorted to without departing from the invention as defined by the claims.

What I claim is:

1. In a device of the class described, a cabinet, a power drum in said cabinet, a reel, a web extending from said drum to said reel, a frame pivotally mounted in said cabinet and movable toward or away from said web, contact apparatus carried by said frame, and means whereby movement of said frame in one direction will disconnect said contact apparatus.

2. In a device of the class described, a cabinet, a movable web within said cabinet, a frame hinged within said cabinet and overlying said web, a plurality of contacts arranged in pairs upon said frame, one contact of each pair resting upon said web, fingers connected with the other of said contacts and projecting rearwardly from said frame, and contact fingers fixed within said cabinet and engaged with said rearwardly projecting contact fingers when the said frame is operatively positioned over said web.

In testimony whereof, I affix my signature.

HENRY A. JONES.